United States Patent
Alekseyev-Popov et al.

(10) Patent No.: US 10,353,116 B2
(45) Date of Patent: Jul. 16, 2019

(54) DELAMINATION RESISTANT COATED SUBSTRATES AND METHODS OF PREPARING THE SAME

(71) Applicant: Gentex Corporation, Carbondale, PA (US)

(72) Inventors: Andrew Vadimovich Alekseyev-Popov, Mt. Kisco, NY (US); John Fernando Cueva, Danbury, CT (US); Jose Inga, Astoria, NY (US)

(73) Assignee: GENTEX CORPORATION, Simpson, PA (US)

( * ) Notice: Subject to any disclaimer, the term of this patent is extended or adjusted under 35 U.S.C. 154(b) by 403 days.

(21) Appl. No.: 14/204,750

(22) Filed: Mar. 11, 2014

(65) Prior Publication Data

US 2014/0272297 A1     Sep. 18, 2014

Related U.S. Application Data (60) Provisional application No. 61/783,129, filed on Mar. 14, 2013.

(51) Int. Cl.
*G02B 1/10* (2015.01)
*G02B 5/28* (2006.01)

(52) U.S. Cl.
CPC ............... *G02B 1/10* (2013.01); *G02B 5/285* (2013.01); *Y10T 156/10* (2015.01); *Y10T 428/24364* (2015.01)

(58) Field of Classification Search
CPC ...................................... G02B 1/115
See application file for complete search history.

(56) References Cited

U.S. PATENT DOCUMENTS

| | | |
|---|---|---|
| 5,166,006 A | 11/1992 | Lai et al. |
| 5,166,066 A | 11/1992 | Lai et al. |
| 6,301,418 B1 | 10/2001 | Freier et al. |
| 6,747,930 B1 | 6/2004 | Weldon et al. |
| 7,256,148 B2 | 8/2007 | Kastenmeier et al. |
| 8,012,203 B2 | 9/2011 | Zhao et al. |

(Continued)

FOREIGN PATENT DOCUMENTS

| | | |
|---|---|---|
| EP | 1616975 A2 | 1/2006 |
| JP | 2000086305 A | 3/2000 |

OTHER PUBLICATIONS

International Search Report and Written Opinion dated Jul. 7, 2014 for International Patent Application No. PCT/US14/23572.

(Continued)

*Primary Examiner* — William P Watkins, III
(74) *Attorney, Agent, or Firm* — Morgan, Lewis & Bockius LLP (57) ABSTRACT

An optical device includes a substrate having a surface, a peripheral edge, an area of vision, and a boundary portion of the surface between the peripheral edge and the area of vision. At least a portion of the boundary portion is textured. A coating is applied to the surface of the substrate over the area of vision and the textured boundary portion. In some embodiments, the substrate is comprised of a polymeric material and the coating is comprised of multiple layers of dielectric material and the substrate is textured such that the textured portion increases adhesion and the durability of the dielectric coating.

28 Claims, 4 Drawing Sheets

(56) References Cited

U.S. PATENT DOCUMENTS

| | | |
|---|---|---|
| 2003/0133209 A1 | 7/2003 | Heine-Kempkens et al. |
| 2004/0096576 A1 | 5/2004 | Chen |
| 2008/0105749 A1* | 5/2008 | Lei ..................... G06K 7/10722 235/462.42 |
| 2010/0065058 A1* | 3/2010 | Ungar ..................... A62B 18/02 128/206.24 |
| 2011/0171416 A1 | 7/2011 | Pickutoski et al. |
| 2012/0008213 A1 | 1/2012 | Tsuda et al. |

OTHER PUBLICATIONS

Supplementary European Search Report dated Sep. 16, 2016 for European Patent Application No. 14772658.
Office Action dated May 1, 2017 for Canadian Patent Application No. 2,904,605.
Examination Report dated Feb. 14, 2018 for European Patent Application No. 14772658.2, 4 pages.
Office Action dated May 7, 2018 for Israel Patent Application No. 241285, 3 pages.

\* cited by examiner

DELAMINATION RESISTANT COATED SUBSTRATES AND METHODS OF PREPARING THE SAME

CROSS-REFERENCE TO RELATED APPLICATIONS

This application claims the benefit of U.S. Provisional Patent Application No. 61/783,129 filed Mar. 14, 2013 entitled "Delamination Resistant Coated Substrates and Methods of Preparing the Same", which is incorporated by reference herein in its entirety.

FIELD OF THE INVENTION

The present invention relates to delamination resistant coated substrates and methods of preparing the same, and in some embodiments, optical devices having a polymeric substrate having a multi-layer dielectric coating and methods of preparing the same.

BRIEF SUMMARY OF THE INVENTION

In one embodiment there is an optical device comprising: a substrate having a surface, a peripheral edge, an area of vision, and a boundary portion on a portion of the surface between the peripheral edge and the area of vision, at least a portion of the boundary portion being textured; and a coating applied to the surface of the substrate over the area of vision and the textured boundary portion. In one embodiment, the substrate comprises a polymer. In one embodiment, the substrate is comprised of a polymer and the coating includes a dielectric coating. In one embodiment, the coating is comprised of two or more layers. In one embodiment, the two or more layers include metal and/or dielectric. In one embodiment, the textured boundary portion is optically opaque. In one embodiment, opposing surfaces of the substrate within the area of vision are smooth. In one embodiment, the textured boundary portion is on one or both side surfaces of the substrate.

In one embodiment, the textured boundary portion is an entire portion of the surface extending between the peripheral edge and the area of vision. In one embodiment, the textured boundary portion is spaced from the peripheral edge. In one embodiment, the textured boundary portion extends entirely around the area of vision. In one embodiment, the optical device further comprises an additional substrate coupled to the coated surface.

In one embodiment, there is a method comprising: providing a substrate having a surface, a peripheral edge, an area of vision, and a boundary portion on a portion of the surface between the peripheral edge and the area of vision; texturing at least a portion of the boundary portion; and applying a coating to the surface of the substrate. In one embodiment, the texturing is performed by an abrasive blasting process. In one embodiment, the abrasive blasting process uses a soft abrasive material. In one embodiment, the soft abrasive material comprises particles of sodium bicarbonate. In one embodiment, the substrate comprises a polymer. In one embodiment, the coating includes a dielectric coating.

In one embodiment, applying the coating includes vacuum depositing one or more layers of material. In one embodiment, the method further comprises trimming the coated substrate around the area of vision to a new peripheral edge such that a remaining portion of the textured boundary extends between the new peripheral edge and the area of vision. In one embodiment, the method further comprises coupling an additional substrate to the coated surface. In on embodiment, the texturing is a result of surface texturing of a mold area specific to the desired textured area such that the substrate receives its textured area as a result of a mold process. In one embodiment, the texturing is performed by a chemical etch.

BRIEF DESCRIPTION OF THE SEVERAL VIEWS OF THE DRAWINGS

The following detailed description of embodiments of the delamination resistant coated substrates and methods of preparing the same, will be better understood when read in conjunction with the appended drawings of exemplary embodiments. It should be understood, however, that the invention is not limited to the precise arrangements and instrumentalities shown.

In the drawings.

DETAILED DESCRIPTION OF THE INVENTION

One or both surfaces of an optically transparent substrate such as a lens, a goggle, or a visor may be coated for a variety of reasons, including to prevent substrate damage, to reduce glare and to provide optical filtering. However, most coatings applied to optically transparent substrates degrade over time. A variety of mechanisms may account for the degradation process, including degradation initiated by delamination of the coating from the substrate. Polymeric materials have a low melting point as compared to inorganic materials such as glass or silica. Depositing coatings onto polymeric substrates is generally performed at temperatures lower than the melting points of the substrates. This may cause the deposited coating to adhere poorly to the surface of the substrates. Consequently, the deposited coating may easily delaminate from the substrate surface when subjected to a sufficient physical and/or thermal stress.

Also, optically transparent polymer substrates tend to have coefficients of thermal expansion that are sometimes significantly different (e.g., an order of magnitude higher) than the coefficients of thermal expansion of the coating materials. Consequently, optically transparent polymer substrates tend to expand and contract in response to changes in temperature at different rates than the deposited coating materials. The difference between thermal expansions and contractions of the coating materials and the substrates means that the coating materials are subjected to high physical stress both at lower and higher temperatures than those used during the coating deposition. Repeated thermal cycling between high and low temperatures only exacerbates the physical stress to which the coating materials are subjected. As a result, the coating may delaminate from the substrate forming cracks in the coating and over time these cracks extend into the coating materials causing the coating to flake from the surfaces of the substrate (see FIG. 1). Delamination may interfere with a user's view through the coated article and substantial delamination of a coating from a coated lens substrate may result in total failure of a coated article, rendering it useless for its intended purpose.

Figure 1:
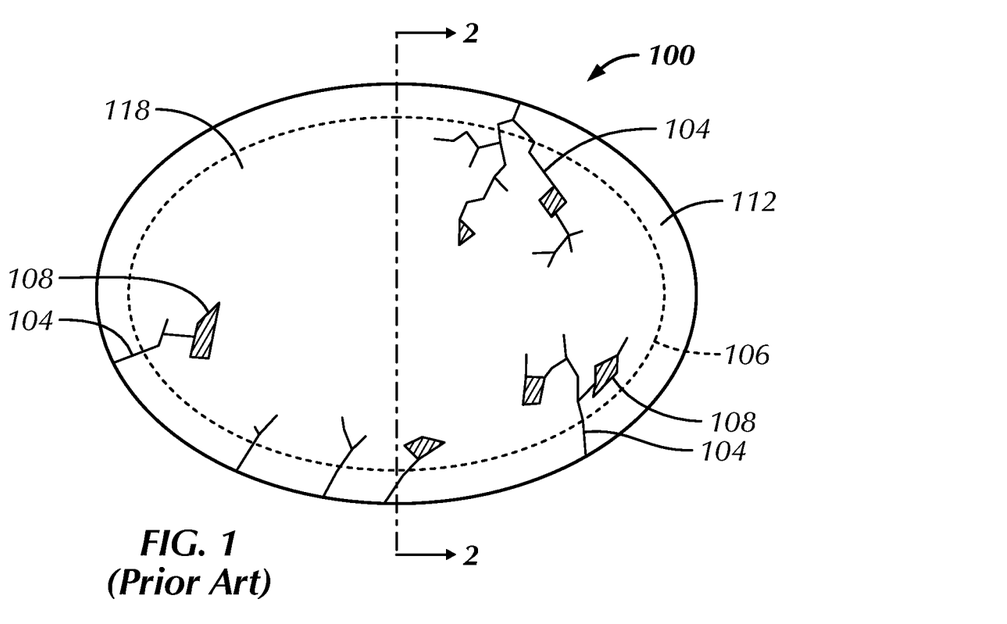
FIG. 1 is a bottom view of a coated lens as known in the art.
Figure 2:
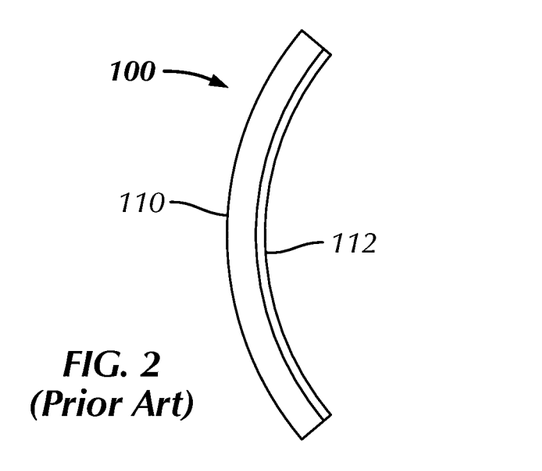
FIG. 2 is a cross sectional side view of the coated lens shown in FIG. 1 taken along line 2-2.

Referring to FIGS. 1 and 2, there is shown a typical coated optical device 100 comprising a substrate 110 having a bottom surface coated with a coating 112. Coating 112 may degrade over time by delaminating from substrate 110 and developing cracks 104 that eventually extend into and obstruct a viewing area 118 (e.g., within boundary line 106) that a user of the coated article 100 looks through to view objects on the other side of coated optical device 100. Shaded regions 108 represent portions of coating 112 that have completely delaminated and lifted off from substrate 110. As shown, a crack 104 in the coating 112 starting at the periphery of coating 112 can spread into multiple cracks that progressively advance until eventually extending past boundary line 106 and into the viewing area 118.

Referring to FIGS. 3-8, the present invention, in exemplary embodiments, relates to an optical device, generally designated 300, 600, 700 and 800, and methods of processing optical devices that enhance the adhesion between the substrate and the coating and increases the durability of the coating (e.g., minimizes or eliminates delamination of the coating from the substrate).

The optical device of the present invention includes a coated substrate. The substrate includes a textured surface portion that increases adhesion of the coating to the substrate. The textured surface may increase the surface area in contact with the coating and achieve a "Velcro-like" effect between the coating and the substrate. In some embodiments, treating only an outer edge area of substrate increases the adhesion between the substrate and the coating while not impacting the optical clarity of the area of vision of the optical device.

Figure 3:
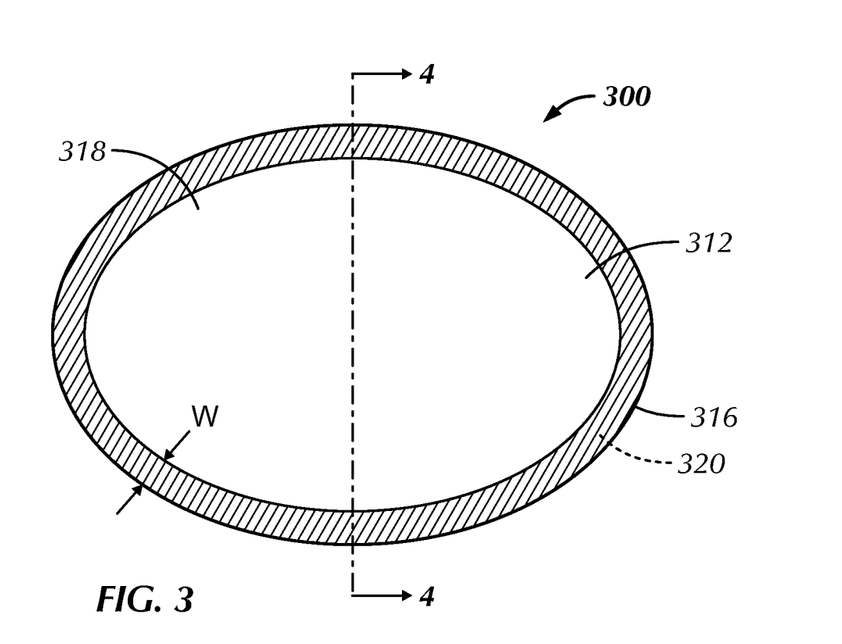
FIG. 3 is a bottom view of a coated substrate in accordance with an exemplary embodiment of the present invention.
Figure 4:
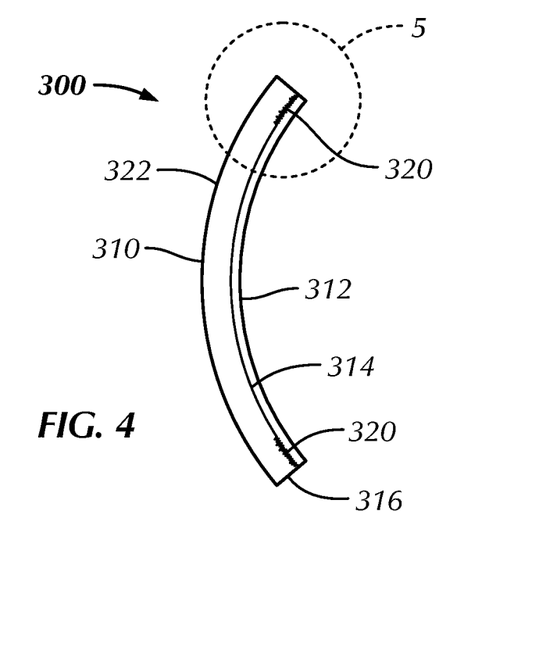
FIG. 4 is a cross sectional side view of the coated substrate shown in FIG. 3 taken along line 4-4.

Referring to FIGS. 3 and 4, a first exemplary embodiment of the present invention is shown. Optical device 300 includes a substrate 310 with a coating 312. Substrate 310 includes a first surface 314, a peripheral edge 316, an area of vision 318 and a boundary portion 320 on a portion of surface 314 extending between peripheral edge 316 and the area of vision 318. At least a portion of boundary portion 320 is textured and the coating 312 is applied to surface 314 over the area of vision 318 and the textured boundary portion 320.

Substrate 310 may have any desirable shape, size and thickness. Substrate 310 may be shaped for use in or as spectacles, shields, lenses, goggles, visors, windows, and/or optical sensor covers. Substrate 310 may have one or more convex and/or concave side surfaces. In other embodiments, substrate 310 has one or more flat side surfaces. Substrate 310 may have an optical power. In other embodiments, substrate 310 has zero optical power. Peripheral edge 316 may be generally circular in shape. In other embodiments, peripheral edge 316 is generally square, oval or a specific shape such as for a lens or a visor.

In some embodiments, substrate 310 is comprised of a polymer. In one embodiment, substrate 310 is comprised of a thermoset material. In one embodiment, the thermoset material is selected from the group consisting of diethylene glycol bis (allyl carbonate) and diallyl diglycol carbonate and a combination thereof. In one embodiment, the thermoset material is selected from the group consisting of polymers of 1,3 butylene glycol dimethacrilate, acrylonitrile, allyl methacrylate, ethoxymethyl methacrylate, ethylene glycol dimethacrylate, polyethylene glycol dimethacrylate, allyl esters, co-polymers of allyl esters with styrene or vinyl type monomers and combinations thereof. In some embodiments, substrate 310 comprises a thermoplastic material. In one embodiment, the thermoplastic material is selected from the group consisting of polysulfones, polyethersulfones, polyamides, polystyrenes, mixtures of polycarbonate and polyurethanes, polystyrenes, polysulfones, polyesters, acrylics and combinations thereof. In some embodiments, substrate 310 comprises a refractive index material. In one embodiment, the high refractive index material is selected from the group consisting of high refractive index copolymers of isocyanates, urethanes, sulfur-containing aromatic vinyl compounds, and bromine-containing aromatic acrylic compounds and combinations thereof.

In one embodiment, coating 312 is a dielectric coating. Dielectric coatings are comprised of transparent dielectric materials and may be used for laser mirrors and/or anti-reflection. Dielectric coatings, also called thin-film coatings or interference coatings, may include thin (e.g., sub-micron) layers of transparent dielectric materials, which are deposited on substrate 310. Coating 312 may essentially modify the reflective properties of substrate 310 by exploiting the interference of reflections from multiple optical interfaces. Coating 312 may be used for highly reflecting laser mirrors (e.g., to protect a user from damage to their eyes from lasers) or partially transmissive output couplers, for dichroic mirrors (treating different wavelengths differently), for anti-reflection coatings, for various kinds of optical filters (e.g., for attenuation of certain wavelength regions), and thin-film polarizers. Coating 312 may include two or more (e.g., over a hundred) of thin-film layers. Coating 312 may include discrete layers (e.g., first layer 312$a$ and second layer 312$b$ shown in FIG. 5) with different refractive indices than one another. In other embodiments, coating 312 may include a gradient-index coating, such as a rugate filter, where the refractive index is varied continuously through a layer. In one embodiment, coating 312 includes at least one metal layer.

In one embodiment, the melting point of coating 312 is different from the melting point of the substrate 310. In one embodiment, coating 312 has a coefficient of thermal expansion that is different from the coefficient of thermal expansion of substrate 310. In one embodiment, coating 312 is comprised of glass. In other embodiments, coating 312 is comprised of metal, semi-conductor and/or polymeric material. In one embodiment, coating 312 includes one or more layers of $TiO_2$, $SiO_2$, $Al_2O_3$, $Ta_2O_5$, $MgF_2$, $LaF_3$ and/or $AlF_3$. In one embodiment, coating 312 has one or more layers having a refractive index of approximately 1.3 to approximately 3.0. Coating 312 may be comprised of any preferred material or combination of materials.

One or both side surfaces 314, 322 of substrate 310 may include a coating 312. In one embodiment, only a portion of a side surface 314, 322 is coated by coating 312. In one embodiment, coating 312 is on surface 314 intended to face a user's eye or sensor. In other embodiments, coating 312 is alternatively, or in addition to, on surface 322 intended to face away from the user's eye or sensor. In some embodiments, coating 312 includes a plurality of layers. In one embodiment, at least one layer of the plurality of coating 312 layers has the same composition as at least one other coating layer. In some embodiments, at least one layer of the coating 312 has a different composition than at least one other layer of coating 312. In some embodiments, coating 312 has a thickness in a range of about 1 µm to about 100 µm.

Figure 5:
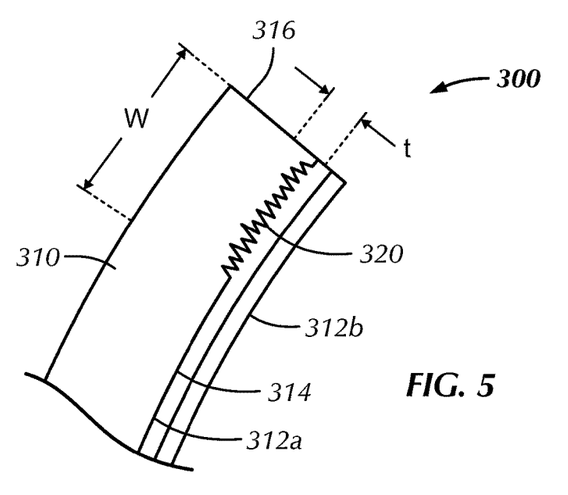
FIG. 5 is an enlarged partial cross sectional side view of the coated substrate of FIG. 4 shown within circle 5.

Referring to FIGS. 3-5, at least a portion of boundary portion 320, on surface 314 between substrate 310 and coating 312 is textured or roughened. Textured boundary portion 320 is around or outside the area of vision 318 (e.g., the portion of optical device 300 that the user looks through). In one embodiment, textured boundary portion 320 circumscribes or surrounds the area of vision 318. In one embodiment, textured boundary portion 320 extends entirely around the periphery of the area of vision 318. In one embodiment, textured boundary portion 320 extends from peripheral edge 316 to the area of vision 318. In one embodiment, the entire boundary portion 320 is textured. In other embodiments, only a portion of boundary portion 320 is textured. In one embodiment, a width w, the distance from the outer edge of textured boundary portion 320 to the inner edge of textured boundary portion 320 varies around the area of vision 318. In one embodiment, width w of boundary portion 320 is generally constant around the area of vision 318. In one embodiment, width w of boundary portion 320 is wider in certain areas (e.g., outside the view of a user such as where a strap attaches to a lens) and narrower in other areas (e.g., inside the view of a user such as a bottom unsupported edge of a lens or visor). In one embodiment, width w of boundary portion 320 is approximately 1 mm or greater. In one embodiment, textured boundary portion 320 only partially extends around the area of vision 318. For example, a top edge along area of vision 318 may be void of texturing or texturing may be spotted or spaced around area of vision 318. In one embodiment, textured boundary portion 320 defines the periphery of area of vision 318. In other embodiments, textured boundary portion 320 is spaced from the area of vision 318.

Referring to FIG. 5, in one embodiment, textured boundary portion 320 forms microstructures. In one embodiment, textured boundary portion 320 has a greater surface area than boundary portion 320 before it was textured. In one embodiment, depth or thickness t of textured boundary portion is approximately 1 µm to approximately 100 µm. In one embodiment, thickness t of textured boundary portion 320 is approximately 3 µm to approximately 5 µm. In one embodiment, thickness t of textured boundary portion 320 is variable to form jagged peaks and valleys.

In one embodiment, textured boundary portion 320 is generally optically opaque. In one embodiment, opposing surfaces of the substrate 314, 322 within the area of vision 318 are smooth or not textured. In other embodiments, surfaces 314, 322 within the area of vision 318 are textured to a lesser extent than textured boundary portion 320 such that the area of vision 318 remains optically transparent. In one embodiment, textured boundary portion 320 is "frosted" as compared to the area of vision 318. In one embodiment, textured boundary portion 320 is textured such that the intensity of a laser beam going through textured boundary portion 320 is less than 5% its original intensity. In one embodiment, textured boundary portion 320 is textured such that the intensity of a laser beam going through textured boundary portion 320 is less than 4% its original intensity. In one embodiment, textured boundary portion 320 is textured such that the intensity of a laser beam going through textured boundary portion 320 is less than 3% its original intensity. In one embodiment, textured boundary portion 320 is textured such that the intensity of a laser beam going through textured boundary portion 320 is less than 2% its original intensity. In one embodiment, textured boundary portion 320 is textured such that the intensity of a laser beam going through textured boundary portion 320 is less than 1% its original intensity.

Figure 6:
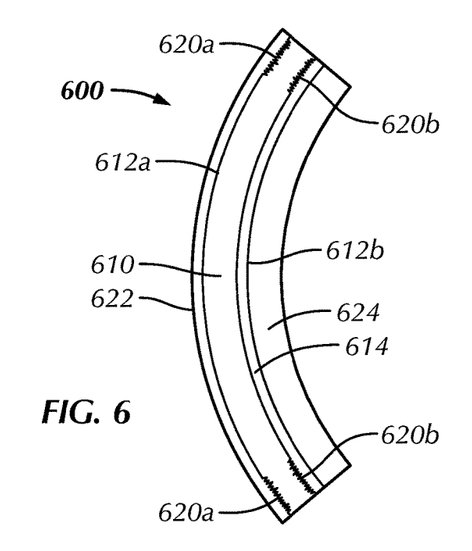
FIG. 6 is a cross sectional side view of a coated substrate in accordance with an exemplary embodiment of the present invention.

Referring to FIG. 6, there is shown a second exemplary embodiment of optical device 600. Optical device 600 may include a substrate 610 having a first coating 612b on a first side surface 614 and a second coating 612a on a second side surface 622. Substrate may include a textured boundary portion 620a, 620b on both side surfaces 614, 622 to improve adhesion of coatings 612a, 612b. Textured boundary portions 620a, 620b may be the same size or different sizes. In one embodiment, coatings 612a, 612b may have the same or different optical properties than one another. In one embodiment, an additional substrate 624 may be included to sandwich coating 612b between substrates 610, 624. Including an additional substrate 624 may provide protection to a user's eyes should optical device 600 be damages causing coating 612b to detach and/or to provide an optical function such as filtering. Additional layers of substrates and coatings may be provided.

Figure 7:
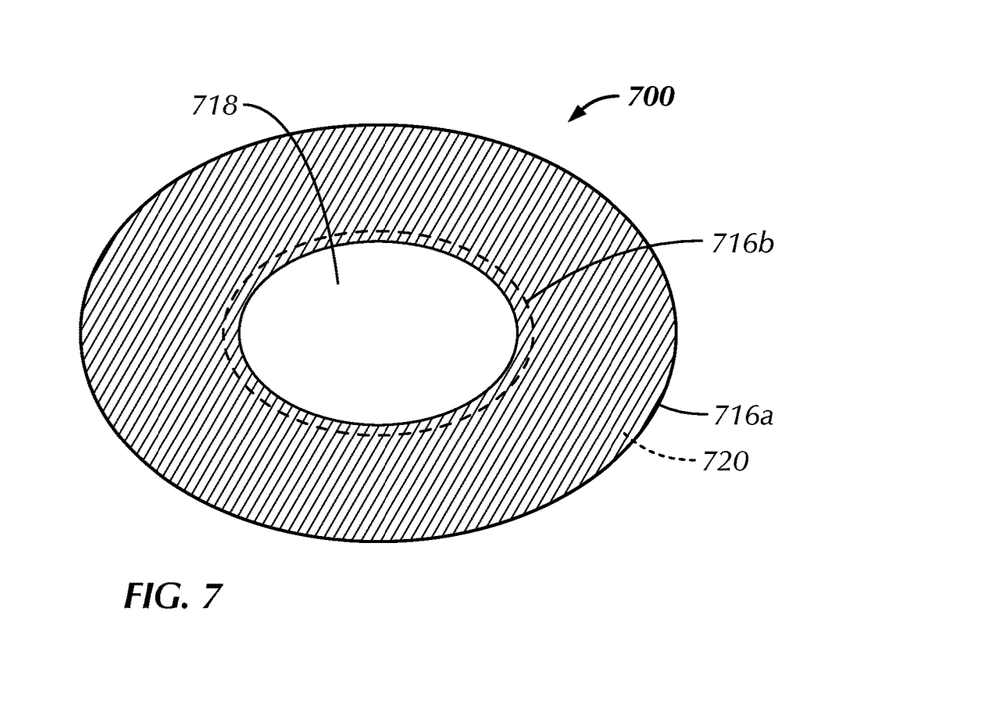
FIG. 7 is a bottom view of a coated substrate in accordance with an exemplary embodiment of the present invention.

Referring to FIG. 7, in a third exemplary embodiment, optical device 700 includes an initial peripheral edge of 716a that is trimmed (e.g., cut or ground) to a reduced final peripheral edge 716b. In one embodiment, boundary portion 720 is textured to the initial peripheral edge and the final width of the textured boundary portion 720 is determined by the trimming of initial peripheral edge 716a down to the final peripheral edge 716b. Trimming the textured boundary portion 720 may assist in processing (e.g., holding a rounded shape during texturing and coating) particularly if the final peripheral edge 716b has a non-circular shape and/or the width of the remaining textured boundary portion 720 is small.

Figure 8:
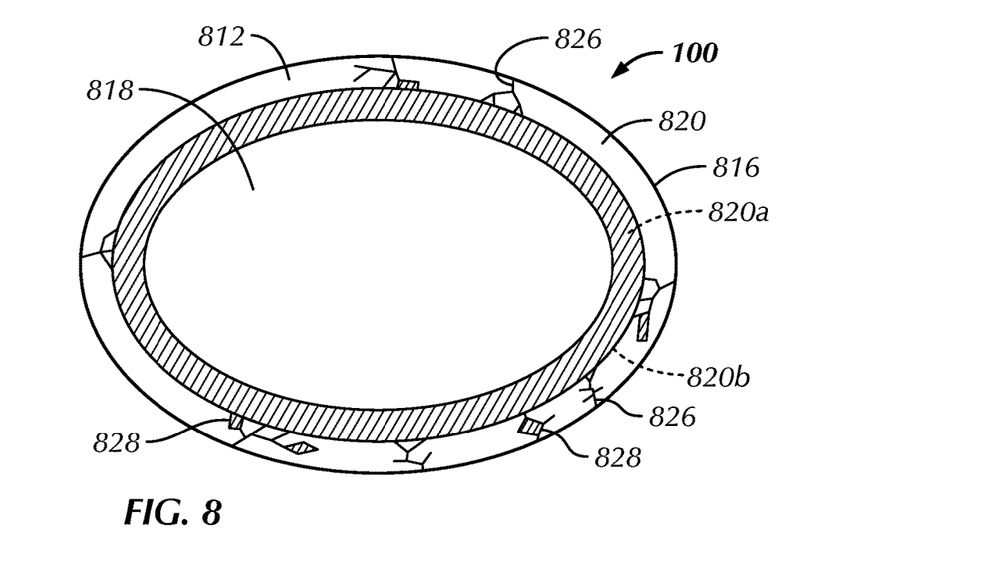
FIG. 8 is a bottom view of a coated substrate in accordance with an exemplary embodiment of the present invention.

Referring to FIG. 8, there is shown a fourth exemplary embodiment of optical device 800. Optical device 800 may include a boundary portion 820 that is only partially textured (shaded area). Textured boundary portion 820a extends from the area of vision 818 to a textured boundary 820b spaced inwardly from peripheral edge 816. The textured boundary 820b may be a sharply defined line as shown. In other embodiments, the textured boundary 820b is faded such that the amount of texturing decreases toward the peripheral edge 816. In one embodiment, any delamination such as cracks 826 or chips 828 formed between coating 812 and the substrate are stopped at textured boundary 820b and are prevented from extending to the area of vision 820.

Referring to FIGS. 3-5, the texturing of boundary portion 320 may be any preferred method. In one embodiment, area of vision 318 is covered or otherwise protected before texturing boundary portion 320. In one embodiment, texturing of boundary portion 320 is a mechanical process. In one embodiment, the texturing step is performed by abrasive blasting the boundary portion 320. The abrasive blasting is conducted by forcibly propelling a stream of abrasive material against surface 314 under high pressure to roughen boundary portion 320. The abrasive blasting may include the use of a soft abrasive material. In one embodiment, the soft abrasive material comprises particles of sodium bicarbonate. In one embodiment, the particles of sodium bicarbonate have an average size of about 50 micron. In one embodiment, the soft abrasive material comprises particles of dry ice. In one embodiment, the soft abrasive material comprises particles of magnesium sulfate. Other mechanical processes may be used for texturing such as scrapping or ultrasonic roughening.

In one embodiment, texturing of boundary portion 320 is a chemical texturing process. Chemical texturing may refer to using an acid solution, alkaline solution, oxidizing agent, reducing agent or any other solution to etch microstructures into substrate 310.

In one embodiment, texturing of boundary portion 320 is an optical texturing process. In one embodiment, texturing of boundary portion 320 is performed with a laser light beam having a wavelength of about 1.064 µm. Any laser may be utilized having any desired wavelength.

In one embodiment, texturing of boundary portion 320 is achieved by the configuration of the substrate mold. For examples, a surface of the mold used to form substrate 310 may be textured such that surface 314 contacting the roughened mold feature results in the textured boundary portion 320.

In other embodiments, texturing of boundary portion 320 is a combination of any of the processes described above.

Once surface 314 of substrate 310 has been sufficiently textured, coating 312 is applied to surface 314. Coating 312 may be deposited to substrate 310 in any preferred manner. In one embodiment, coating 312 is applied to substrate 310 by a vacuum vapor deposition process. In one embodiment, coating 312 is deposited on a spinning substrate 310 to spread coating 312 over surface 314. In one embodiment, coating 312 is sprayed onto substrate 310. In one embodiment, coating 312 is electron beam deposited onto substrate 310. In one embodiment, coating 312 is ion-assisted deposited (IAD) onto substrate 310. In one embodiment, coating 312 is ion beam sputtered (IBS) onto substrate 310. In one embodiment, coating is advanced plasma reactive sputtered (APRS) onto substrate 310.

In one embodiment, a thermally curable coating composition 312 is applied to substrate 310. In one embodiment, a radiation curable coating composition 312 is applied substrate 310. In one embodiment, ultra violet (UV) curable coating composition 312 is applied to substrate 310 and then irradiated with UV radiation to form coating 312.

In some embodiments, coating 312 becomes integral with substrate 310. In one embodiment, substrate 310 is considered to be "grown" or thickened with the additional material of coating 312. In one embodiment, coating 312 flows into and bonds with the microstructures of the textured boundary portion 320.

In some embodiments, after depositing coating 312 onto substrate 310 an additional substrate layer 624 (see FIG. 6) may be attached to coating 312. In some embodiments, after depositing coating 312 onto substrate 310 the optical device 300 is trimmed down to reduce the width w of boundary portion 320 (see FIG. 7).

In one embodiment, the method making optical device 300 results in an adhesion between substrate 310 and coating 312 that is substantially improved compared with coated substrates whose surfaces have not been roughened. In one embodiment, enhanced adhesion between substrate 310 and coating 312 prevents coating 312 from delaminating or prevent any delamination from propagating into the area of vision 318.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. The words "top" and "bottom" designate directions in the drawings to which reference is made. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

We claim:

1. An optical device comprising:
a substrate having a surface, a peripheral edge, and an area of vision, a portion of the surface forming a boundary portion between the peripheral edge and the area of vision, at least a portion of the boundary portion being textured; and
a coating applied to the surface of the substrate over the area of vision and the textured boundary portion,
wherein the area of vision is optically transparent.

2. The optical device of claim 1, wherein the substrate comprises a polymer.

3. The optical device of claim 1, wherein the substrate is comprised of a polymer and the coating includes a dielectric coating.

4. The optical device of claim 1, wherein the coating is comprised of two or more layers.

5. The optical device of claim 4, wherein the two or more layers include metal and/or dielectric.

6. The optical device of claim 1, wherein the textured boundary portion is optically opaque.

7. The optical device of claim 1, wherein opposing surfaces of the substrate within the area of vision are smooth.

8. The optical device of claim 1, wherein the textured boundary portion is on one or both side surfaces of the substrate.

9. The optical device of claim 1, wherein the textured boundary portion is an entire portion of the surface extending between the peripheral edge and the area of vision.

10. The optical device of claim 1, wherein the textured boundary portion is spaced from the peripheral edge.

11. The optical device of claim 1, wherein the textured boundary portion extends entirely around the area of vision.

12. The optical device of claim 1 further comprising:
an additional substrate coupled to the coated surface.

13. A method comprising:
providing a substrate having a surface, a peripheral edge, and an area of vision, a portion of the surface forming a boundary portion between the peripheral edge and the area of vision;
texturing at least a portion of the boundary portion; and
applying a coating to the surface of the substrate,
wherein the area of vision is optically transparent.

14. The method of claim 13, wherein the texturing is performed by an abrasive blasting process.

15. The method of claim 14, wherein the abrasive blasting process uses a soft abrasive material.

16. The method of claim 15, wherein the soft abrasive material comprises particles of sodium bicarbonate.

17. The method of claim 13, wherein the substrate comprises a polymer.

18. The method of claim 13, wherein the coating includes a dielectric coating.

19. The method of claim 13, wherein applying the coating includes vacuum depositing one or more layers of material.

20. The method of claim 13 further comprising trimming the coated substrate around the area of vision to a new peripheral edge such that a remaining portion of the textured boundary extends between the new peripheral edge and the area of vision.

21. The method of claim 13 further comprising coupling an additional substrate to the coated surface.

22. The method of claim 13, wherein the texturing is a result of surface texturing of a mold area specific to the desired textured area such that the substrate receives its textured area as a result of a mold process.

23. The method of claim 13, wherein the texturing is performed by a chemical etch.

24. The method of claim 13, wherein the texturing at least a portion of the boundary portion step includes rendering the textured portion of the boundary portion optically opaque.

25. The optical device of claim 1, wherein the substrate includes a second surface opposite the first surface and the textured boundary portion is on both surfaces of the substrate.

26. The optical device of claim 1, wherein the textured boundary portion includes jagged peaks and valleys.

27. The optical device of claim 1, wherein a thickness of the textured boundary portion is variable from approximately 3 µm to approximate 5 µm.

28. The optical device of claim 1, wherein the textured boundary portion is configured such that an intensity of a laser beam passing through the textured boundary portion is less than 1% of an intensity of the laser beam entering the textured boundary portion.

* * * * *